(12) United States Patent
Miki (10) Patent No.: US 7,236,316 B2
(45) Date of Patent: Jun. 26, 2007

(54) LENS BARREL ASSEMBLY AND ASSEMBLING METHOD THEREFOR

(75) Inventor: Renzaburo Miki, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/291,343

(22) Filed: Nov. 30, 2005

(65) Prior Publication Data

US 2006/0114581 A1    Jun. 1, 2006

(30) Foreign Application Priority Data

Nov. 30, 2004    (JP)    ............... 2004-346186

(51) Int. Cl.
*G02B 7/02*    (2006.01)

(52) U.S. Cl. ............ 359/819; 359/822; 359/823

(58) Field of Classification Search ............ 359/819, 359/820, 821, 822, 823, 824, 825, 826, 827, 359/811, 813, 814

See application file for complete search history.

(56) References Cited

U.S. PATENT DOCUMENTS

2001/0005288 A1*   6/2001 Hayashi et al. ............ 359/826

2002/0106205 A1    8/2002 Kikuchi et al.

FOREIGN PATENT DOCUMENTS

| CN | 1363051 | 8/2002 |
|----|---------|--------|
| JP | 5-088066 | 4/1993 |
| JP | 9-33782 | 2/1997 |

* cited by examiner

*Primary Examiner*—Timothy Thompson
(74) *Attorney, Agent, or Firm*—David G. Conlin; Steven M. Jensen; Edwards Angell Palmer & Dodge LLP (57) ABSTRACT

An opening direction of guide grooves formed in sub bearing portions 55, 58 are different from an opening direction of guide grooves formed in the main bearing portions 54, 57. Therefore, when the first, second lens holders 31, 32 can easily be assembled to the main guide shaft 50 and the sub guide shaft 51 by one operation that after the fitting of the sub guide shaft 51 into the guide groove of the sub bearing portion 55, 58 in the first, second lens holder 31, 32, the first, second lens holder 31, 32 is rotated and slid against the sub guide shaft 51 so that the guide groove of the main bearing portion 54, 57 is fitted to the main guide shaft 50 in Y direction.

6 Claims, 10 Drawing Sheets

LENS BARREL ASSEMBLY AND ASSEMBLING METHOD THEREFOR

This nonprovisional application claims priority under 35 U.S.C. §119(a) on Patent Application No. 2004-346186 filed in Japan on Nov. 30, 2004, the entire contents of which are hereby incorporated by reference.

BACKGROUND OF THE INVENTION

The present invention relates to an inner lens type lens barrel assembly and an assembling method therefor.

Figure 13:
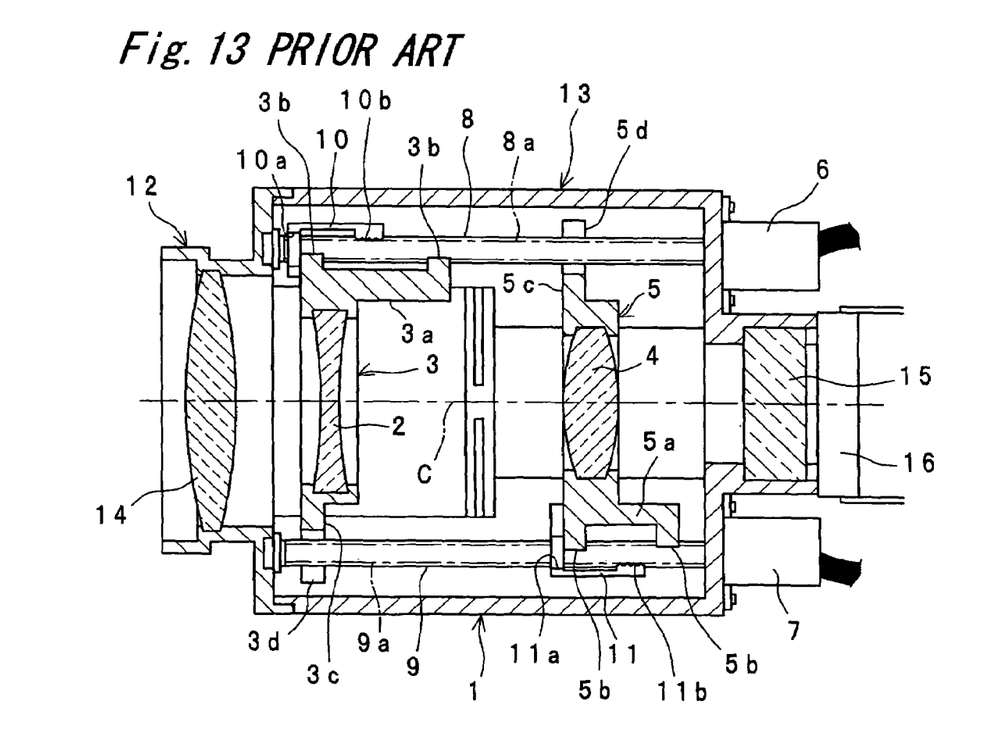
FIG. 13 is a sectional view showing a conventional lens barrel assembly.
Figure 14:
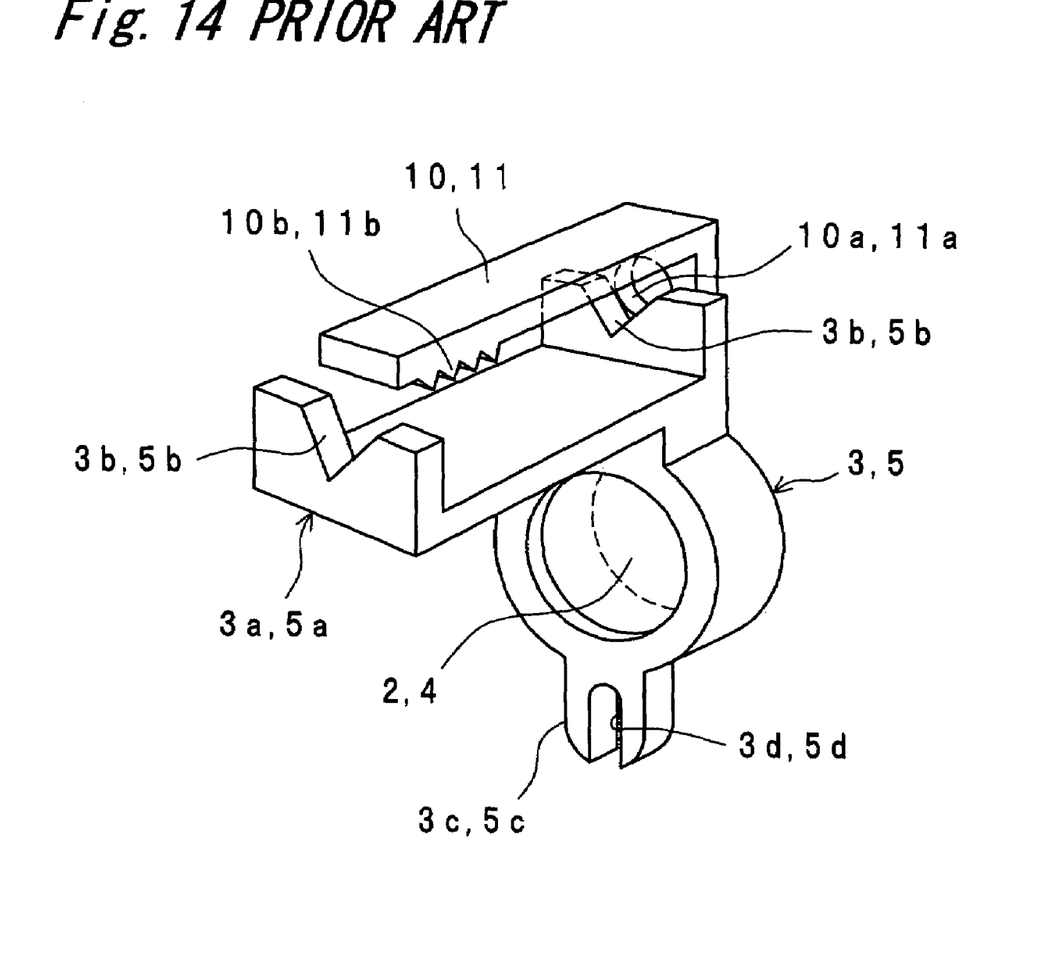
FIG. 14 is a showing the structure of the first, second movable lens frames in FIG. 13.

In video cameras, for example, there has been used an inner-focus type lens barrel assembly which attains focusing by moving element lenses of a compensator lens group, a master lens group and the like along the optical axis in small steps. An example of that is shown in FIGS. 13 and 14 (see JP 3089500 B).

In this lens barrel assembly 1, a first movable lens frame 3 which holds a variator lens 2 for use of zooming and a second movable lens frame 5 which holds a master lens 4 for use of focusing are driven directly by rotation of driving shafts 8, 9 performed by an upper-and-lower pair of stepping motors 6, 7. In this case, the driving shafts 8, 9 have four functional roles as motor shafts, drive transmission shafts, sliding shafts and anti-rotation shafts.

The first movable lens frame 3 that holds the variator lens 2 and the second movable lens frame 5 that holds the master lens 4 are basically identical in structure to each other except that they are up-down inverse to each other. FIG. 14 shows structures of the first, second movable lens frames 3, 5. The structure of the first movable lens frame 3 is explained below with reference to FIG. 14.

The first movable lens frame 3 has an upper portion 3a and a lower portion 3c. The upper portion 3a extends along the direction of an optical axis C of the variator lens 2, and bearing portions are provided thereon at one end and the other end in the optical axis direction so as to be erected in directions perpendicular to the optical axis C. Then, V-grooves 3b, 3b are provided at upper sides of the bearing portions, and the driving shaft 8 is supported from the lower side and guided by these two V-grooves 3b, 3b. On an outer wall of one of the two bearing portions that is positioned outer in the optical axis direction, one board portion of an elastic member 10 which is formed of an L-shape bent board is fitted and fixed, where a clearance hole 10a which allows the driving shaft 8 to be inserted therethrough is provided at the one board portion. On the other hand, the other board portion of the elastic member 10 has elasticity, and a rack portion 10b is provided at its end portion so as to engage with a lead screw portion 8a of the driving shaft 8 from the upper side.

At a lower portion 3c of the first movable lens frame 3, a generally U-shaped guide groove 3d having an opening on its lower side is provided so as to extend vertically. By the lower side driving shaft 9 being inserted into the guide groove 3d, the first movable lens frame 3 is prevented from rotating about the upper side driving shaft 8.

In this way, the first movable lens frame 3 is prevented from rotation by the lower side driving shaft 9 being inserted into the guide groove 3d of the lower portion 3c, while the V-grooves 3b, 3b of the bearing portions in the upper portion 3a support the upper side driving shaft 8 from the lower side and moreover the rack portion 10b engages with the lead screw portion 8a of the driving shaft 8 from the upper side by the elastic force of the elastic member 10. Accordingly, as the driving shaft 8 is driven into rotation by the stepping motor 6, the variator lens 2 is enabled to reciprocate along the optical axis C together with the first movable lens frame 3.

Meanwhile, the second movable lens frame 5, as described above, has a structure up-down inverse to the first movable lens frame 3. Therefore, the second movable lens frame 5 is prevented from rotation by the upper-side driving shaft 8 being inserted into a guide groove 5d of an upper portion 5c, while V-grooves 5b, 5b of bearing portions in a lower portion 5a support the lower side driving shaft 9 from the upper side and moreover a rack portion 11b is engaged with a lead screw portion 9a of the driving shaft 9 from the lower side by the elastic force of an elastic member 11. Accordingly, as the driving shaft 9 is driven into rotation by the stepping motor 7, the master lens 4 is enabled to reciprocate along the optical axis C together with the second movable lens frame 5.

In addition, reference numerals 12, 13 denote lens barrel assemblies, 14 denotes a focus lens, 15 denotes an optical low-pass filter, and 16 denotes a CCD (Charge Coupled Device) unit.

However, the prior art lens barrel assembly disclosed in JP 3089500 B has problems shown below.

That is, the driving shafts 8, 9, which have four functional roles as motor shafts, drive transmission shafts, sliding shafts and anti-rotation shafts, are supported by different parts that are the front-side lens barrel assembly 12 and the rear-side lens barrel assembly 13, respectively. Due to this, the driving shafts 8, 9 may easily tilt, so that they are likely to be entangled and immobilized when the first movable lens frame 3 and the second movable lens frame 5 move along the optical axis C, problematically. Then, if the front-side lens barrel assembly 12 and the rear-side lens barrel assembly 13 are provided as a part having an integrated structure for solution of the above problem, it would become impossible to insert and assemble the first, second movable lens frames 3, 5 to the driving shafts 8, 9 in the direction of the optical axis C, posing a problem of degraded assemblability.

Also, the driving shafts 8, 9 are provided in a lead screw structure. Due to this, in the case where the driving shaft 8, 9 is inserted and assembled to the first, second movable lens frame 3, 5 in the direction of the optical axis C, there is a fear that inserting the driving shaft 8, 9 into the first, second movable lens frame 3, 5 might cause the rack portions 10b, 11b to be damaged because the rack portions 10b, 11b of the L-shaped elastic members 10, 11 fixed to the first, second movable lens frames 3, 5 are arranged to be engaged with the lead screw portions 8a, 9a by elastic force.

Therefore, in the case where the rack portion 10b, 11b is inserted while being bent toward a direction of separating from the driving shaft 8, 9 against the elastic force of the elastic member 10, 11 in order to prevent the rack portion 10b, 11b from being damaged, it may occur in some cases that the other board portion of the L-shaped elastic member 10, 11 is plastically deformed erroneously beyond its limitation of elastic deformation. In such a case, the elastic force of the other board portion would decrease, so that the rack portion 10b, 11b would no longer be engaged with the lead screw portion 8a, 9a, problematically.

SUMMARY OF THE INVENTION

Accordingly, an object of the present invention is to provide a lens barrel assembly, as well as an assembling method therefor, in which a lens holder for holding a movable lens can simply be assembled by one operation to main and sub two guide shafts set parallel to an optical axis and moreover movable lens can be moved smoothly in the optical axis direction.

In order to achieve the above object, according to the present invention, there is provided a lens barrel assembly comprising:

a barrel for housing at least a movable lens;

two guide shafts placed in the barrel so as to be parallel to an optical axis; and a lens holder which holds the movable lens and which is movable along the optical axis under guide by the guide shafts, wherein in the lens holder, two guide grooves to be respectively fitted to the two guide shafts are provided, and a direction toward which an opening portion of one guide groove out of the two guide grooves is directed is different from a direction toward which an opening portion of the other guide groove is directed.

According to the above structure, the one guide groove of the two guide grooves provided in the lens holder is fitted to one guide shaft out of the two guide shafts, in which state the lens holder is rotated or slid against the one guide shaft so that the other guide groove is fitted to the other guide shaft. Thus, the lens holder can be assembled to the two guide shafts easily by one operation.

Further, the direction toward which the opening portion of the one guide groove out of the two guide grooves is directed is different from the direction toward which the opening portion of the other guide groove is directed. Therefore, after the two guide grooves are fitted to the two guide shafts respectively, the lens holder never departs from the guide shafts.

It is noted here that the terms "the direction toward which the opening portion of the guide groove is directed" refer to not a direction vertical to the opening face formed by the opening edge of the opening portion, but a direction toward which both wall surfaces of the guide groove extend.

In one embodiment, the barrel is divisible in a direction vertical to the optical axis into a first barrel portion including the lens holder and the two guide shafts and a second barrel portion including a driving mechanism for moving the lens holder along the optical axis.

In this embodiment, by separating the first barrel portion and the second barrel portion with a division plane parallel to the optical axis in a direction perpendicular to the optical axis, the lens holder can easily be assembled to the two guide shafts within the first barrel portion.

One embodiment further comprises an elastic member which is provided at a vicinity of the one guide groove of the lens holder and which presses the vicinity of the one guide groove of the lens holder toward the guide shaft by elastic force caused by press of the second barrel portion when the second barrel portion is coupled to the first barrel portion.

In this embodiment, after the lens holder is assembled to the two guide shafts in the first barrel portion as described above, the second barrel portion is coupled to the first barrel portion in a direction perpendicular to the optical axis. Then, by the elastic force occurring to the elastic member, the vicinity of the one guide groove in the lens holder is pressed toward the guide shaft. Thus, even if the direction toward which the opening portion of the one guide groove in the lens holder is directed is inverse to the gravitative direction, the guide shaft can be prevented from falling off from the one guide groove.

In one embodiment, with regard to the guide groove positioned in the vicinity of the elastic member in the lens holder, a cross section of the guide groove in a direction perpendicular to the optical axis direction is U-shaped; and a direction of a line perpendicular to a plane including the optical axis and a straight line given by a string of points at which a bottom wall of the guide groove makes contact with the guide shaft is identical to a direction of a normal line orthogonal to the bottom wall of the guide groove and orthogonal to the straight line, and moreover the guide groove is opened along the direction of the normal line.

According to this embodiment, the direction of the normal line perpendicular to the bottom wall of the guide groove and perpendicularly intersecting the straight line given by the string of points at which the bottom wall of the guide groove and the guide shaft make contact with each other, i.e. the direction in which the guide shaft is inserted into the guide groove, is perpendicular to a plane containing the straight line and the optical axis. Accordingly, rattling of the guide shaft and the guide groove can be reduced, and misalignment between the center of the movable lens held by the lens holder and the optical axis can be reduced.

In one embodiment, the movable lens and the lens holder that holds the movable lens are provided in a plural quantity, and for all the lens holders, the one identical guide shaft is to be inserted through the guide groove located in the vicinity of the elastic member.

In this embodiment, since the one identical guide shaft is to be inserted through the guide groove located in the vicinity of the elastic member for all the plural lens holders, the axial misalignment amount between the movable lenses depends on the mounting accuracy of the guide shaft. Therefore, the adjustment between the movable lenses for their lens center misalignment can be eliminated.

An assembly method for a lens barrel assembly of the present invention comprises:

fitting one guide groove out of two guide grooves, which are provided in a lens holder for holding a lens, to one guide shaft out of two guide shafts placed in a barrel in parallel to an optical axis;

with the one guide groove fitted to the one guide shaft, making the lens holder rotated or slid against the one guide shaft so that the other guide groove whose opening portion is directed toward a direction different from a direction toward which an opening portion of the one guide groove is directed is fitted to the other guide shaft; and pressing a vicinity of the one guide groove in the lens holder toward the guide shaft by an elastic member provided at the vicinity of the one guide groove in the lens holder.

According to the above constitution, the lens holder can be assembled to the two guide shafts easily by one operation. Further, the direction toward which the opening portion of the one guide groove out of the two guide grooves is directed is different from the direction toward which the opening portion of the other guide groove is directed. Therefore, after the two guide grooves are respectively fitted to the two guide shafts, the lens holder never departs from the guide shafts.

As apparent from the above description, in the lens barrel assembly of the present invention, the direction toward which the opening portion of one guide groove out of two guide grooves provided in the lens holder is directed is different from the direction toward which the opening portion of the other guide groove is directed. Therefore, the one guide groove is fitted to one guide shaft out of the two guide shafts, in which state the lens holder is rotated or slid against the one guide shaft, by which the other guide groove can be fitted to the other guide shaft. Thus, the lens holder can be assembled to the two guide shafts easily by one operation.

Further, the direction toward which the opening portion of the one guide groove out of the two guide grooves is directed is different from the direction toward which the opening portion of the other guide groove is directed. Therefore, after the two guide grooves are respectively fitted to the two guide shafts, the lens holder can be prevented from departing from the guide shafts.

Also, the assembling method for a lens barrel assembly according to the present invention includes the steps of, in a state that one guide groove provided in the lens holder is fitted to one guide shaft, making the lens holder rotated or slid against the one guide shaft so that the other guide groove whose opening portion is directed toward a direction different from the direction of the opening portion of the one guide groove is fitted to the other guide shaft, and then pressing a vicinity of the one guide groove in the lens holder toward the guide shaft by the elastic member. Therefore, the lens holder can be assembled to the two guide shafts easily by one operation. Further, the directions of the opening portions of the two guide grooves are different from each other. Therefore, after the two guide grooves are fitted to the two guide shafts independently, the lens holder can be prevented from departing from the guide shafts.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Figure 1:
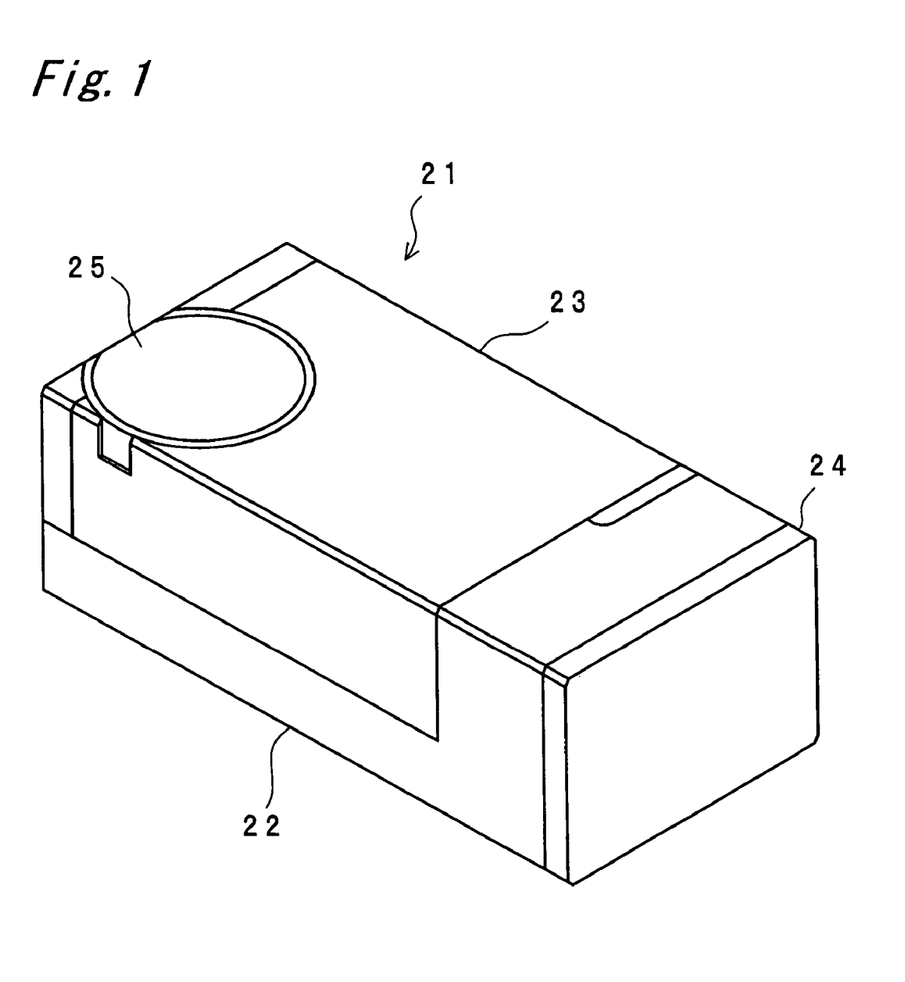
FIG. 1 is a perspective view of a lens barrel assembly according to the present invention.

Hereinbelow, the present invention is described in detail by way of embodiments thereof illustrated in the accompanying drawings. FIG. 1 is a perspective view of a lens barrel assembly of this embodiment. A lens barrel assembly 21 in this embodiment is composed roughly of an optical unit 22, a driving unit 23 having a zoom/focus lens driving mechanism, and an image pickup unit 24 containing therein image pickup devices given by CCDs or the like. In this case, a first image-taking lens 25 is provided at a corner portion of a side face of the driving unit 23.

Figure 2:
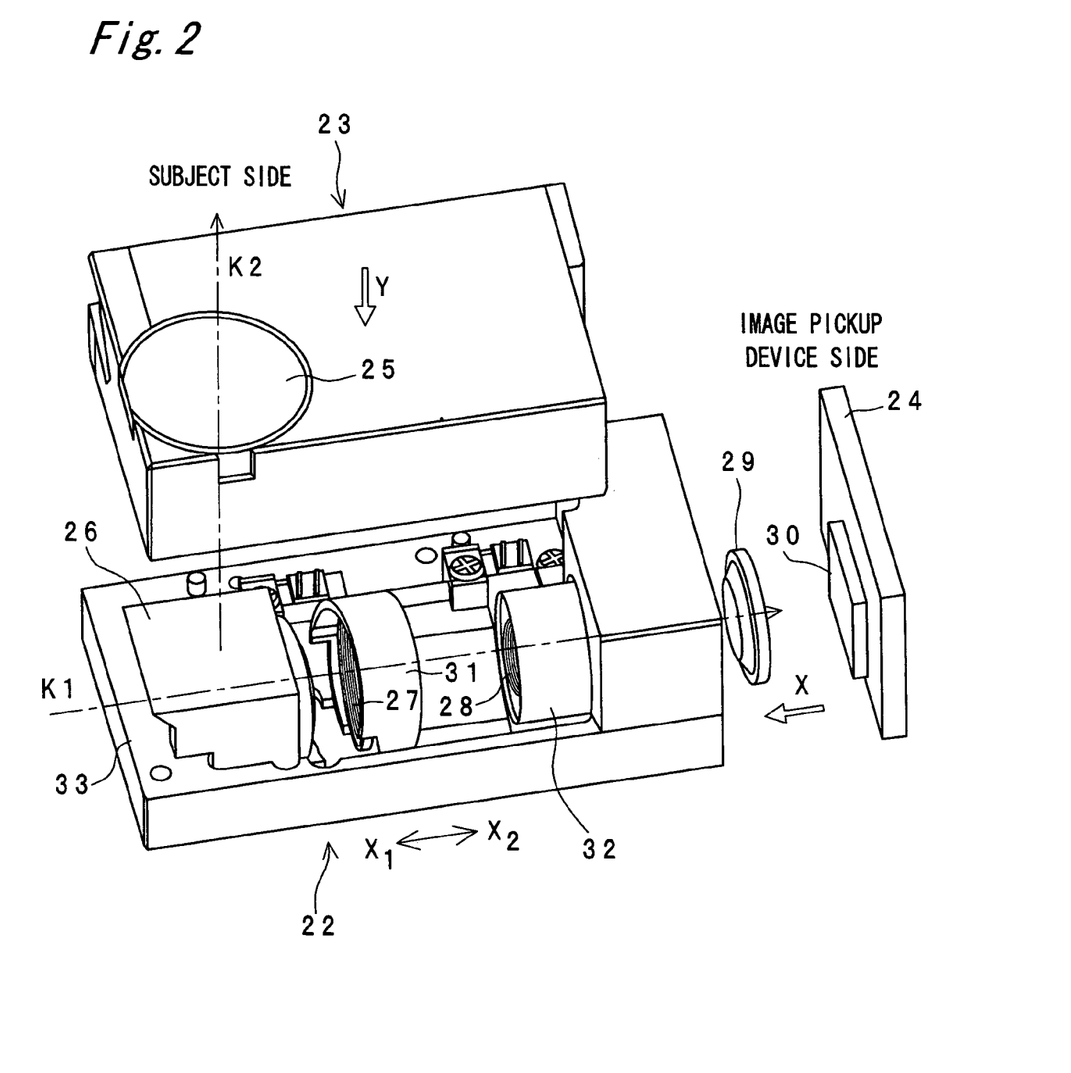
FIG. 2 is a view showing a state that a driving unit and an image pickup unit are separated from an optical unit in FIG. 1.

As shown in FIG. 2, the driving unit 23 is separable from the optical unit 22 in a direction of an optical axis K2 of the first image-taking lens 25. In the optical system of the lens barrel assembly 21 in this embodiment, unlike the conventional lens barrel assembly shown in FIG. 13, an incident beam of light passes through the first image-taking lens 25, which is fixed to a subject-side side face of the driving unit 23, and then bent by 90 degrees by an optical path changing element 26 which is formed of a prism or the like included in the optical unit 22 in the rear of the first image-taking lens 25, so that the beam passes through a focus lens 27, a zoom lens 28 and a second image-taking lens 29, in this order, which are arranged in the optical unit 22, thus being let to be incident on an image pickup device 30 mounted on the image pickup unit 24. In addition, the focus lens 27 is held by a first lens holder 31 and the zoom lens 28 is held by the a second lens holder 32, these lenses being assembled to the optical unit 22 so as to be movable in both arrow $X_1$ direction and arrow $X_2$ direction along an optical axis K1.

The optical unit 22 has, in its subject-side side face, an opening portion which the driving unit 23 covers and closes in a direction of arrow Y. Similarly, the driving unit 23 also has an opening portion in its side face on one side on which the driving unit 23 covers the optical unit 22. Then, closing the opening portion of the optical unit 22 by the opening portion of the driving unit 23 in the Y direction forms part of the appearance configuration of the lens barrel assembly 21. Further, when the image pickup unit 24 with the image pickup device 30 mounted thereon is assembled in the direction of arrow X, this lens barrel assembly 21 is made up. It is noted that reference numeral 33 denotes an optical base that serves as a reference for assembly of optical equipment to the optical unit 22.

Figure 3:
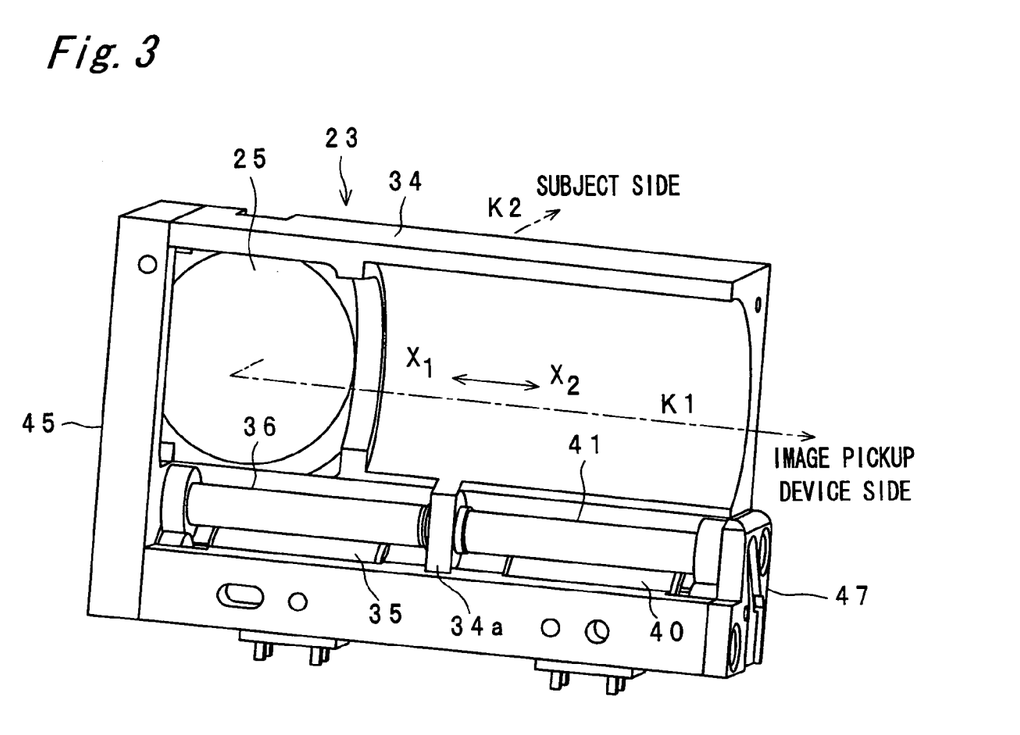
FIG. 3 is an appearance view of the driving unit in FIG. 1 as viewed from an opening portion side.

FIG. 3 shows an appearance view of the driving unit 23 as viewed from the opening portion side. In a gear case 34, a focusing motor 35, a focusing lead screw 36, and focusing transmission gears 37, 38, 39 (see FIG. 7) for transmitting the power of the focusing motor 35 to the focusing lead screw 36 are disposed along the optical axis K1 in the arrow $X_1$ and arrow $X_2$ directions (where these three parts will be referred to generically as focus driving section). Likewise, a zooming motor 40, a zooming lead screw 41, and zoom transmission gears 42, 43, 44 (see FIG. 7) for transmitting the power of the zooming motor 40 to the zooming lead screw 41 (where these three parts will be referred to generically as zoom driving section) are disposed via a bearing portion 34a in series to the focus driving section and moreover in left-and-right symmetry in FIG. 3.

In FIG. 3, the focusing lead screw 36 and the zooming lead screw 41 are simplified in drawing with their screw portions omitted. This is also the case with the other figures.

The focus driving section is fitted and fixed to the bearing portion 34a of the gear case 34 and a focus-driving-section cover 45 with screws (not shown). In this case, the focusing lead screw 36 is suppressed from displacement in thrust directions (arrow $X_1$ and $X_2$ directions) by a focusing-lead-screw pressurizing spring 46 (see FIG. 7). Also, the zoom driving section is fitted and fixed to the bearing portion 34a of the gear case 34 and a zoom-driving-section cover 47 with screws (not shown). In this case, the zooming lead screw 41 is suppressed from displacement in thrust directions (arrow $X_1$ and $X_2$ directions) by a zoom-lead-screw pressurizing spring 48 (see FIG. 7).

Figure 4:
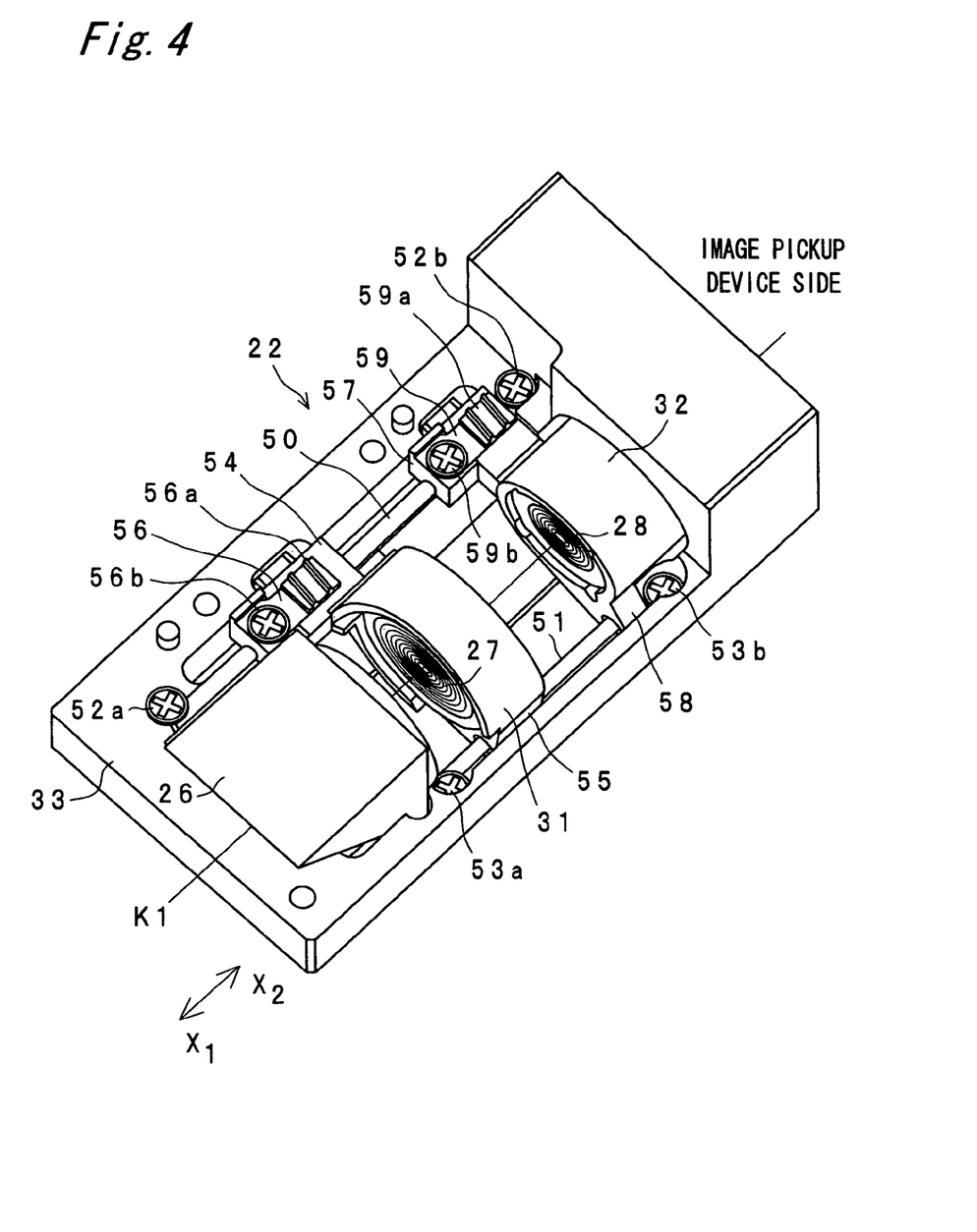
FIG. 4 is an appearance view of the optical unit in FIG. 1 as viewed from the opening portion side.

FIG. 4 shows an appearance view of the optical unit 22 as viewed from the opening portion side. In the optical base 33, a main guide shaft 50 and a sub guide shaft 51 are supported and fixed at their both ends by screws 52*a*, 52*b* and 53*a*, 53*b*. Further, in the optical base 33 are mounted stationary lenses being the optical path changing element 26 and the second image-taking lens 29 (see FIG. 2), as well as movable lenses being the focus lens 27 and the zoom lens 28. Then, the focus lens 27 and the zoom lens 28 are held on the first lens holder 31 and the second lens holder 32, respectively, and assembled to the main guide shaft 50 and the sub guide shaft 51 fixed to the optical base 33 so as to be slidable along the optical axis K1 in the arrow $X_1$ and $X_2$ directions as described in detail below.

The first lens holder 31 includes a main bearing portion 54 which is fitted to and guided by the main guide shaft 50, and a sub bearing portion 55 which is fitted to and guided by the sub guide shaft 51 and which prevents the first lens holder 31 from rotating about the main guide shaft 50. Then, on the main bearing portion 54, a rack-provided plate spring 56 is mounted with a screw 56*b* in such a way that its rack portion 56*a* faces the focusing lead screw 36 (see FIG. 7). Similarly, the second lens holder 32 includes a main bearing portion 57 which is fitted to and guided by the main guide shaft 50, and a sub bearing portion 58 which is fitted to and guided by the sub guide shaft 51 and which prevents the second lens holder 32 from rotating about the main guide shaft 50. Then, on the main bearing portion 57, a rack-provided plate spring 59 is mounted with a screw 59*b* in such a way that its rack portion 59*a* faces the zooming lead screw 41 (see FIG. 7).

Figure 5:
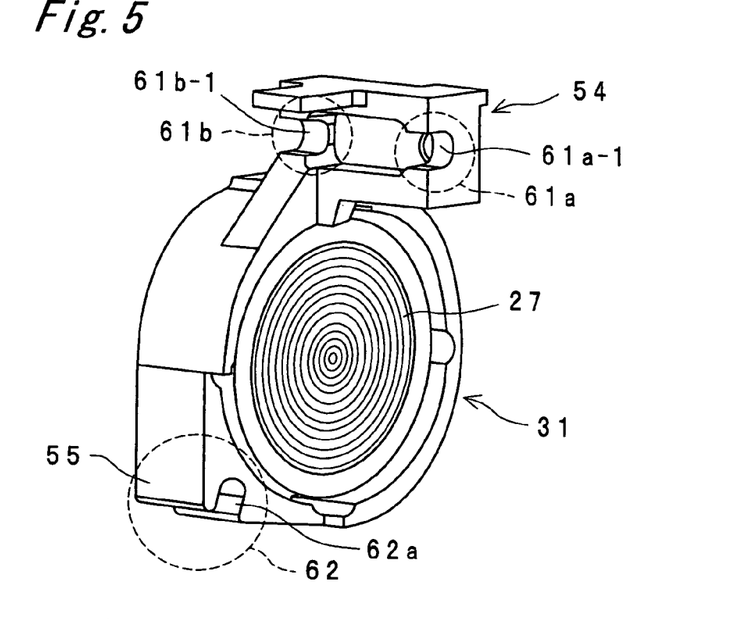
FIG. 5 is an appearance perspective view of a first lens holder in FIG. 1 as viewed from the optical base side.

FIG. 5 shows an appearance perspective view of the first lens holder 31 as viewed from the optical base 33 side. The main bearing portion 54 includes a pair of bearing portions 61*a*, 61*b* which are spaced from each other by a specified distance along the main guide shaft 50 and moreover fitted to and guided by the main guide shaft 50 and each of which has a guide groove 61*a*-1, 61*b*-1 with a U-shaped cross section. Also, the sub bearing portion 55 includes a bearing portion 62 which is fitted to and guided by the sub guide shaft 51 and each of which has a guide groove 62*a* with a U-shaped cross section. In this case, the opening direction of the guide groove 62*a* formed in the bearing portion 62 of the sub bearing portion 55 (the direction in which both wall surfaces of the U-shaped guide groove 62*a* extend) is different from the opening direction of the guide grooves 61*a*-1, 61*b*-1 of the bearing portions 61*a*, 61*b* of the main bearing portion 54.

Figure 6:
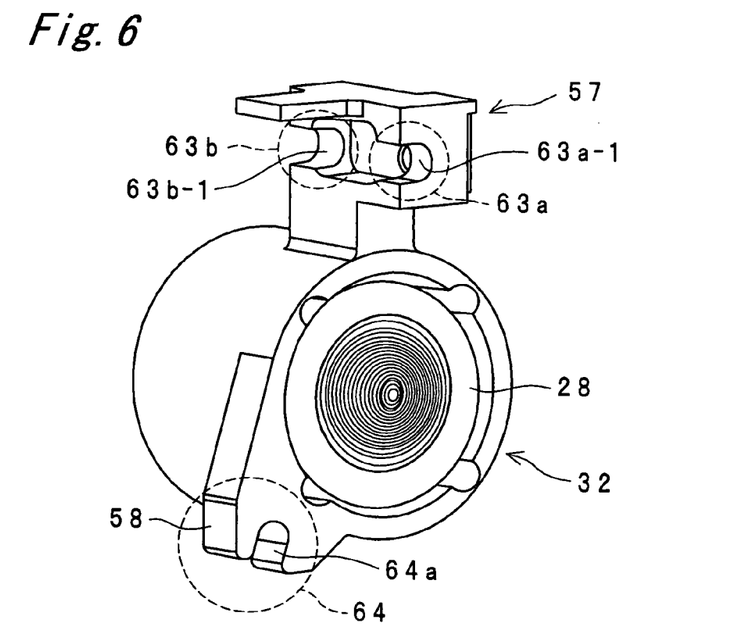
FIG. 6 is an appearance perspective view of a second lens holder in FIG. 1 as viewed from the optical base side.

FIG. 6 shows an appearance perspective view of the second lens holder 32 as viewed from the optical base 33 side. The main bearing portion 57 includes a pair of bearing portions 63*a*, 63*b* which are spaced from each other by a specified distance along the main guide shaft 50 and moreover fitted to and guided by the main guide shaft 50 and each of which has a guide groove 63*a*-1, 63*b*-1 with a U-shaped cross section. Also, the sub bearing portion 58 includes a bearing portion 64 which is fitted to and guided by the sub guide shaft 51 and each of which has a guide groove 64*a* with a U-shaped cross section. In this case, the opening direction of the guide groove 64*a* formed in the bearing portion 64 of the sub bearing portion 58 is different from the opening direction of the guide grooves 63*a*-1, 63*b*-1 of the bearing portions 63*a*, 63*b* of the main bearing portion 57.

The opening direction of the guide grooves 61*a*-1, 61*b*-1 of the pair of bearing portions 61*a*, 61*b* of the first lens holder 31 as well as the opening direction of the guide grooves 63*a*-1, 63*b*-1 of the pair of bearing portions 63*a*, 63*b* of the second lens holder 32 is directed toward a direction in which the driving unit 23 is assembled to the optical unit 22 (Y direction). As a result of this, it becomes possible to assemble the first lens holder 31 and the second lens holder 32 to the main guide shaft 50, which is supported and fixed at its both ends, in the Y direction, which is generally perpendicular to the optical axis K1 of the focus lens 27 and the zoom lens 28 without departing from the main guide shaft 50.

Moreover, as described above, each of the main bearing portions 54, 57 of the first, second lens holders 31, 32 includes a pair of bearing portions 61*a*, 61*b* and 63*a*, 63*b* which are spaced from each other by a specified distance along the main guide shaft 50. Accordingly, the main bearing portions 54, 57 are enabled to move in the optical axis K1 direction smoothly and without rattling and without bending the main guide shaft 50.

Furthermore, the opening direction of the guide grooves 62*a*, 64*a* formed in the bearing portions 62, 64 of the sub bearing portions 55, 58 is set different from the opening direction of the guide grooves 61*a*-1, 61*b*-1, 63*a*-1, 63*b*-1 formed in the bearing portions 61*a*, 61*b* and 63*a*, 63*b* of the main bearing portions 54, 57. Accordingly, the first, second lens holders 31, 32 can easily be assembled to the main guide shaft 50 and the sub guide shaft 51 by one operation that after the fitting of the sub guide shaft 51 into the guide groove 62*a*, 64*a* of the sub bearing portion 55, 58 in the first, second lens holder 31, 32, the first, second lens holder 31, 32 is rotated and slid against the sub guide shaft 51 as the fitting of the guide groove 62*a*, 64*a* of the sub bearing portion 55, 58 and the sub guide shaft 51 is maintained so that the guide groove 61*a*-1, 61*b*-1, 63*a*-1, 63*b*-1 of the main bearing portion 54, 57 are fitted to the main guide shaft 50 in the Y direction. Furthermore, setting the Y direction to the gravitative direction prevents the guide grooves 61*a*-1, 61*b*-1, 63*a*-1, 63*b*-1 of the main bearing portions 54, 57 and the guide grooves 62*a*, 64*a* of the sub bearing portions 55, 58 from departing from the main guide shaft 50 and the sub guide shaft 51.

Figure 7:
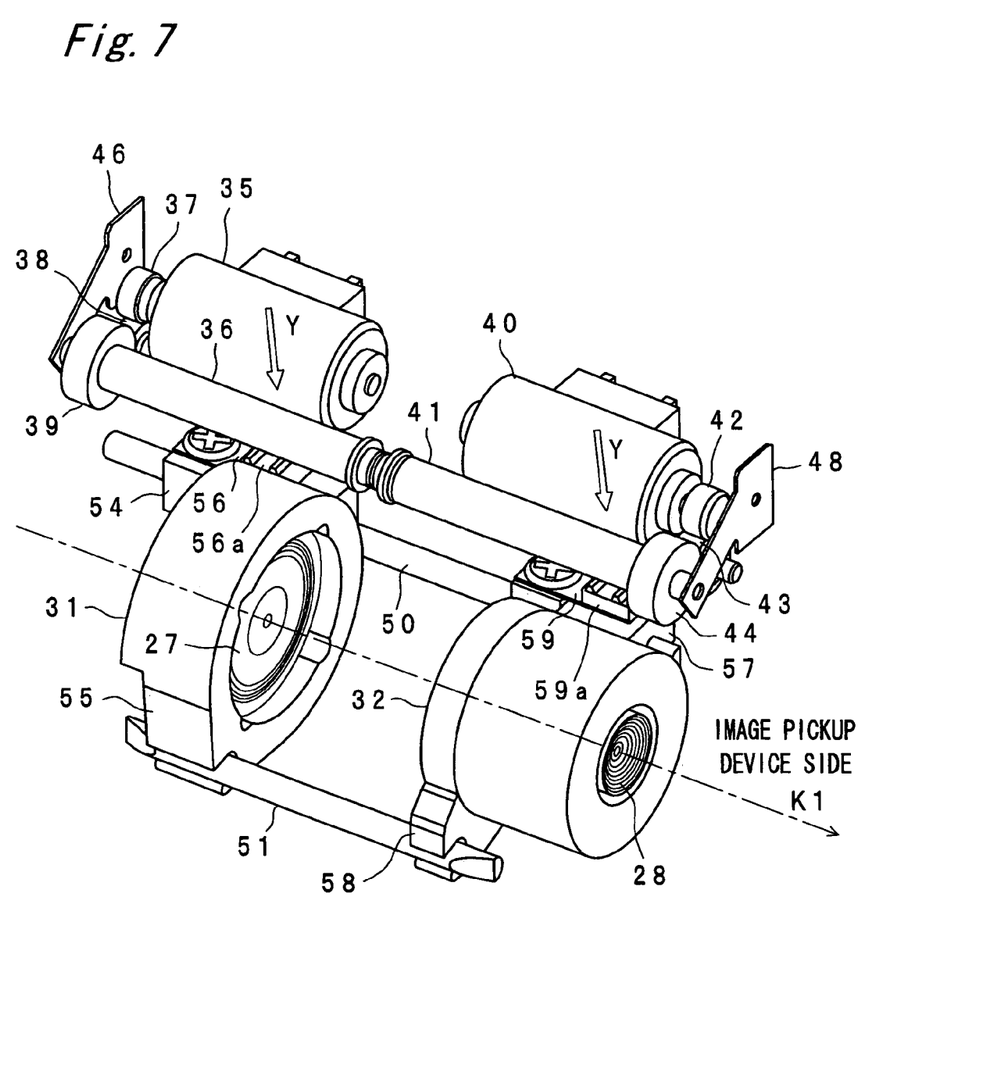
FIG. 7 is a perspective view showing relationships between the first, second lens holders and a focus driving section and a zoom driving section when the driving unit is assembled to the optical unit.
Figure 8:
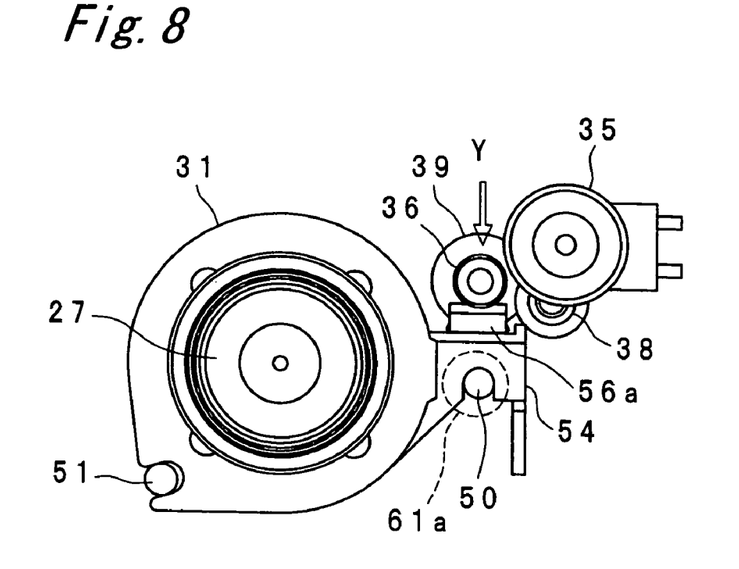
FIG. 8 is a side view of the first lens holder and the focus driving section in FIG. 7.
Figure 9:
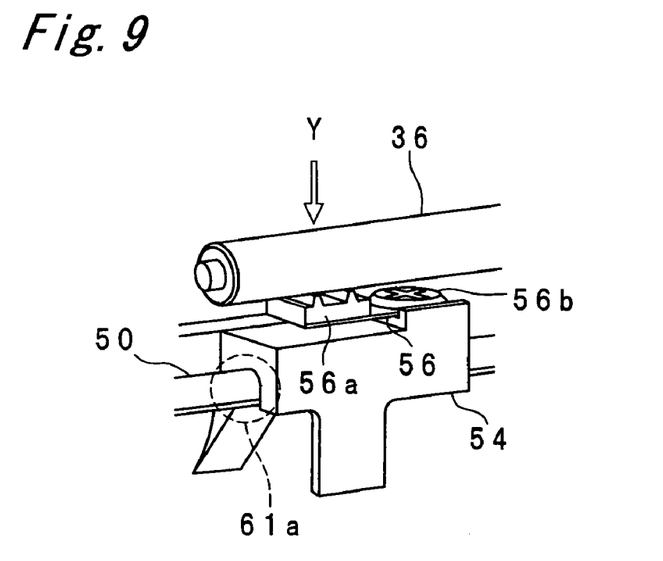
FIG. 9 is a view showing a state of engagement between a focusing lead screw and a rack portion in FIG. 7.

FIGS. 7 to 9 are views showing relationships of the first lens holder 31 and the second lens holder 32 to the focus driving section and the zoom driving section when the driving unit 23 is assembled to the optical unit 22. It is noted that FIG. 7 is an overall perspective view, FIG. 8 is a side view-of the first lens holder 31 and the focus driving section, and FIG. 9 is a view showing the engaging state of the focusing lead screw 36 and the rack portion 56*a*.

When the driving unit 23 is assembled to the optical unit 22, the focusing lead screw 36 and the zooming lead screw 41 biases the rack portions 56*a*, 59*a* of the rack-provided plate springs 56, 59 in the Y direction. As a result, elastic force occurs to the rack-provided plate springs 56, 59, so that the main bearing portion 54 of the first lens holder 31 and the main bearing portion 57 of the second lens holder 32 are pressurized in the Y direction in contact against the main guide shaft 50. Thus, even if the guide grooves 61*a*-1, 61*b*-1, 63*a*-1, 63*b*-1 in the main bearing portions 54, 57 have openings, the first lens holder 31 and the second lens holder 32 never depart from the main guide shaft 50.

As shown above, according to the structure shown in FIGS. 1 to 9, with respect to the optical unit 22, as the main guide shaft 50 and the sub guide shaft 51 remain supported by their both ends, the first, second lens holders 31, 32 can be assembled to the main and sub guide shafts 50, 51 in a direction perpendicular to the optical axis K1. As a consequence, the assemblability is enhanced, and moreover the first, second lens holders 31, 32 can be maintained successful in slidability without bending the main and sub guide shafts 50, 51 as compared with cases of one-end support. In particular, the surface of the optical base 33 on which the main and sub guide shafts 50, 51 are to be mounted is a flat surface, so that a tolerance grade of plus or minus 15 µm can be achieved whichever the formation method is one by cutting process or another by molding process. Therefore, for example, in a case where the movable range of the zoom lens 28 is set to 8 mm and the length of the main guide shaft 50 is set to its double, i.e. 16 mm, the axial misalignment amount of the zoom lens 28 on a zooming of the second lens holder 32 is 15 µm at a maximum, barely falling within the axial misalignment tolerance. However, actually, the length of the main guide shaft 50 is set to a value which is a double or more of the movable range of the zoom lens 28 in consideration of margins.

Also, since the pair of bearing portions 61a, 61b of the first lens holder 31 and the pair of bearing portions 63a, 63b of the second lens holder 32 make sliding contact with one identical main guide shaft 50, the inter-lens axial misalignment accuracy between the focus lens 27 and the zoom lens 28 comes to depend on the mounting accuracy of the main guide shaft 50. Thus, also by virtue of the elongated length of the main guide shaft 50, it becomes possible to eliminate the adjustment between the lens groups.

Figure 10:
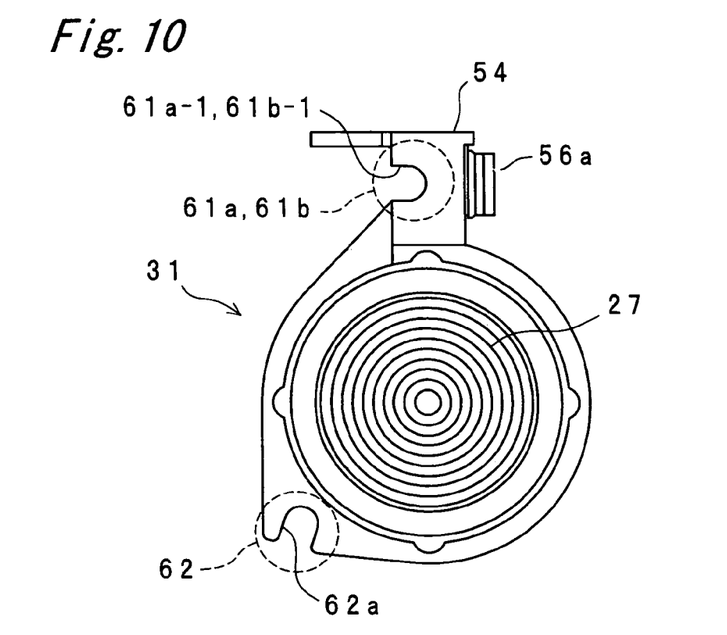
FIG. 10 is a front view of the first lens holder.
Figure 11:
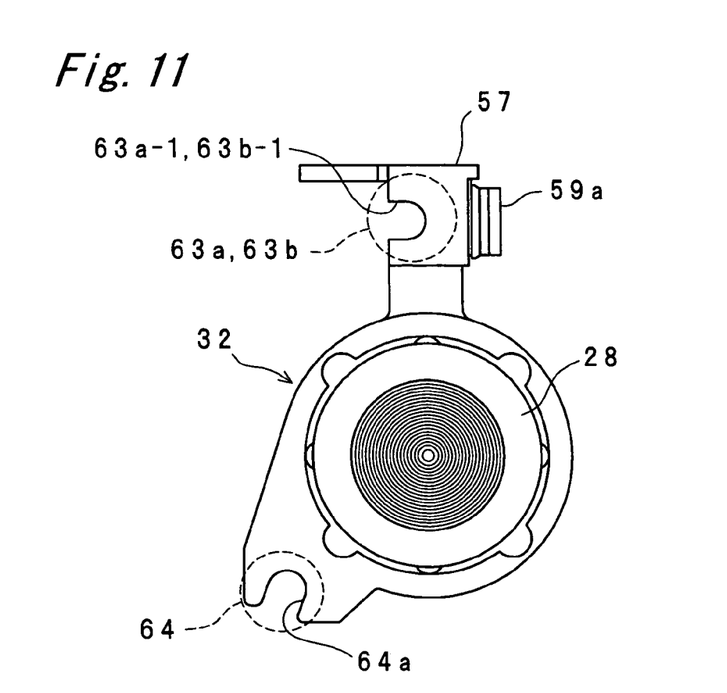
FIG. 11 is a front view of the second lens holder.

FIG. 10 is a front view of the first lens holder 31, and FIG. 11 is a front view of the second lens holder 32. Also, FIG. 12 is an enlarged sectional view of the U-shaped guide grooves 61a-1, 61b-1, 63a-1, 63b-1 formed in the bearing portions 61a, 61b and 63a, 63b of the main bearing portions 54, 57 in the first, second lens holders 31, 32, as well as the main guide shaft 50 in contact with the bottom walls of the guide grooves 61a-1, 61b-1, 63a-1, 63b-1.

Figure 12:
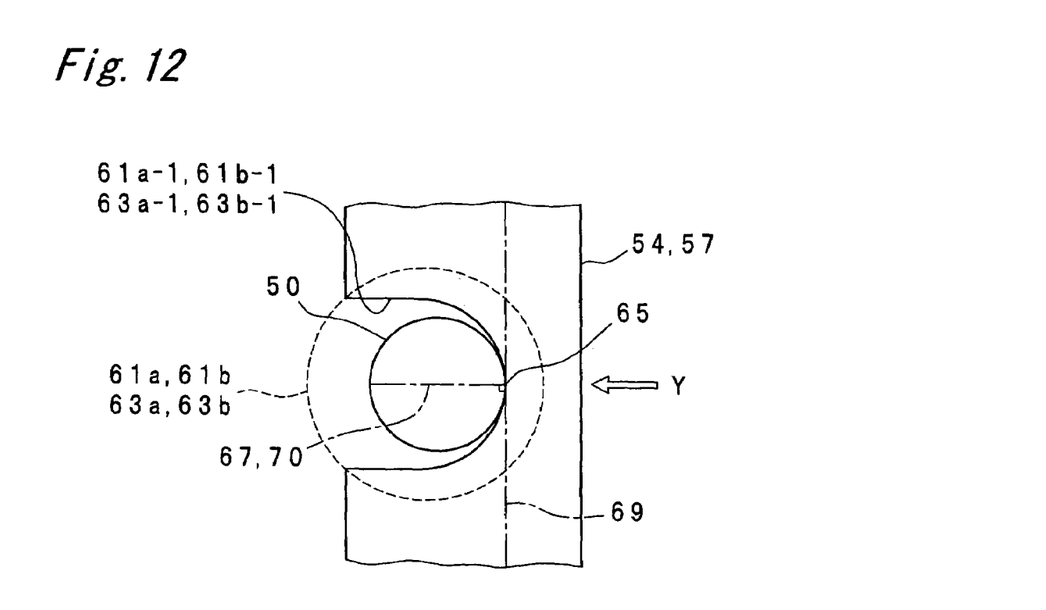
FIG. 12 is an enlarged sectional view of a guide groove of a bearing portion and a primary guide shaft.

As shown in FIGS. 10 to 12, a normal line 67 to the bottom wall of guide grooves 61a-1, 61b-1, 63a-1, 63b-1 that passes through a straight line 65, which is given by a string of points at which bottom walls of the U-shaped guide grooves 61a-1, 61b-1, 63a-1, 63b-1 formed in the bearing portions 61a, 61b and 63a, 63b of the main bearing portions 54, 57 in the first, second lens holders 31, 32 make contact with the main guide shaft 50, and a vertical line 70 to a plane 69 that passes through the straight line 65 and the optical axis K1, are identical in direction to each other. Then, the guide grooves 61a-1, 61b-1, 63a-1, 63b-1 are opened in the direction of the normal line 67. Therefore, as shown in FIG. 12, elastic force exerted in the Y direction via the rack-provided plate spring 56 acts on the main guide shaft 50, making it possible to reduce rattles between the diameter of the main guide shaft 50, which is of minus tolerance, and the diameters of the U-shaped guide grooves 61a-1, 61b-1, 63a-1, 63b-1, which are of plus tolerances. Thus, it follows that misalignment between the center lines of the movable lenses 27, 28 held on the first, second lens holders 31, 32 and the optical axis K1 due to the rattling is suppressed, making it possible to achieve successful optical characteristics of the whole optical unit 22.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A lens barrel assembly comprising:
a barrel for housing at least a movable lens;
two guide shafts placed in the barrel so as to be parallel to an optical axis; and
a lens holder which holds the movable lens and which is movable along the optical axis under guide by the guide shafts, wherein
in the lens holder, two guide grooves to be respectively fitted to the two guide shafts are provided, and
a direction toward which an opening portion of one guide groove out of the two guide grooves is directed is different from a direction toward which an opening portion of the other guide groove is directed, wherein
the opening portion of the one guide groove is not directed toward a peripheral direction of the lens holder while the opening portion of the other guide groove is directed toward the peripheral direction of the lens holder such that the other guide groove is fitted to the other guide shaft when the lens holder is rotated or slid against the one guide shaft in such a state that the one guide groove is fitted to the one guide shaft.

2. A lens barrel assembly, comprising:
a barrel for housing at least a movable lens;
two guide shafts placed in the barrel so as to be parallel to an optical axis; and
a lens holder which holds the movable lens and which is movable along the optical axis under guide by the guide shafts, wherein
in the lens holder, two guide grooves to be respectively fitted to the two guide shafts are provided, and
a direction toward which an opening portion of one guide groove out of the two guide grooves is directed is different from a direction toward which an opening portion of the other guide groove is directed, wherein
the barrel is divisible in a direction vertical to the optical axis into a first barrel portion including the lens holder and the two guide shafts and a second barrel portion including a driving mechanism for moving the lens holder along the optical axis.

3. The lens barrel assembly as claimed in claim 2, further comprising
an elastic member which is provided at a vicinity of the one guide groove of the lens holder and which presses the vicinity of the one guide groove of the lens holder toward the guide shaft by elastic force caused by press of the second barrel portion when the second barrel portion is coupled to the first barrel portion.

4. The lens barrel assembly as claimed in claim 3, wherein with regard to the guide groove positioned in the vicinity of the elastic member in the lens holder,
a cross section of the guide groove in a direction perpendicular to the optical axis direction is U-shaped; and
a direction of a line perpendicular to a plane including the optical axis and a straight line given by a string of points at which a bottom wall of the guide groove makes contact with the guide shaft is identical to a direction of a normal line orthogonal to the bottom wall of the guide groove and orthogonal to the straight line, and moreover the guide groove is opened along the direction of the normal line.

5. The lens barrel assembly as claimed in claim 4, wherein the movable lens and the lens holder that holds the movable lens are provided in a plural quantity, and
for all the lens holders, the one identical guide shaft is to be inserted through the guide groove located in the vicinity of the elastic member.

6. An assembling method for a lens barrel assembly, comprising:

fitting one guide groove out of two guide grooves, which are provided in a lens holder for holding a lens, to one guide shaft out of two guide shafts placed in a barrel in parallel to an optical axis;

with the one guide groove fitted to the one guide shaft, making the lens holder rotated or slid against the one guide shaft so that the other guide groove whose opening portion is directed toward a direction different from a direction toward which an opening portion of the one guide groove is directed is fitted to the other guide shaft; and pressing a vicinity of the one guide groove in the lens holder toward the guide shaft by an elastic member provided at the vicinity of the one guide groove in the lens holder.

* * * * *